United States Patent
Sanderovich et al.

(10) Patent No.: US 10,340,607 B2
(45) Date of Patent: Jul. 2, 2019

(54) ANTENNA ARRAYS FOR COMMUNICATIONS DEVICES

(71) Applicant: QUALCOMM Incorporated, San Diego, CA (US)

(72) Inventors: Amichai Sanderovich, Atlit (IL); Elimelech Ganchrow, Zichron Yaakov (IL); Moshe Marat Donskoy, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/240,685

(22) Filed: Aug. 18, 2016

(65) Prior Publication Data

US 2017/0062908 A1 Mar. 2, 2017

Related U.S. Application Data

(60) Provisional application No. 62/210,131, filed on Aug. 26, 2015.

(51) Int. Cl.
*H01Q 21/06* (2006.01)
*H01Q 21/20* (2006.01)
(Continued)

(52) U.S. Cl.
CPC .......... *H01Q 21/067* (2013.01); *H01Q 1/246* (2013.01); *H01Q 21/065* (2013.01);
(Continued)

(58) Field of Classification Search
CPC .. H01Q 21/062; H01Q 21/065; H01Q 21/067; H01Q 21/205; H01Q 21/24; H01Q 25/00; H01Q 3/26
See application file for complete search history.

(56) References Cited

U.S. PATENT DOCUMENTS 6,133,882 A * 10/2000 LaFleur ............... H01Q 1/38
343/700 MS
7,420,507 B2 9/2008 Thomas et al.
(Continued)

OTHER PUBLICATIONS

International Search Report and Written Opinion—PCT/US2016/047905—ISA/EPO—dated Oct. 27, 2016.
(Continued)

*Primary Examiner* — Dameon E Levi
*Assistant Examiner* — Ab Salam Alkassim, Jr.
(74) *Attorney, Agent, or Firm* — Loza & Loza, LLP/Qualcomm

(57) ABSTRACT

Systems and methods for wireless communications are provided. More particularly, disclosed aspects generally relate to an apparatus with an improved antenna design and use thereof. According to these aspects, the apparatus includes a substrate, first antennas disposed in the substrate, and second antennas disposed in the substrate. Each of the first antennas are configured to have a peak gain in one or more first directions substantially perpendicular to the substrate and each of the second antennas are configured to have a peak gain in one or more second directions substantially diverging from the first directions. According to these aspects, a subset of first and the second antennas contributing to the communications session can be determined and power for gain amplifiers not associated with the subset can be reduced.

22 Claims, 14 Drawing Sheets

(51) Int. Cl.
*H01Q 1/24* (2006.01)
*H01Q 25/00* (2006.01)
*H04B 7/0456* (2017.01)

(52) U.S. Cl.
CPC ........... *H01Q 21/205* (2013.01); *H01Q 25/00* (2013.01); *H04B 7/0465* (2013.01); *H01Q 21/062* (2013.01)

(56) References Cited

U.S. PATENT DOCUMENTS

| | | | |
|---|---|---|---|
| 8,174,442 B2 | 5/2012 | Haskell | |
| 8,692,730 B2 | 4/2014 | Shimizu et al. | |
| 9,183,424 B2* | 11/2015 | Koch | G06K 7/10356 |
| 9,252,485 B2 | 2/2016 | Hants et al. | |
| 9,595,766 B2* | 3/2017 | Ashrafi | H01Q 21/061 |
| 9,659,904 B2* | 5/2017 | Kamgaing | H01Q 21/093 |
| 9,793,963 B2* | 10/2017 | Grau Besoli | H04B 7/0617 |
| 10,153,557 B2* | 12/2018 | Sudo | H01Q 9/16 |
| 10,205,224 B2* | 2/2019 | Mow | H01Q 1/243 |
| 2003/0197647 A1* | 10/2003 | Waterman | H01Q 13/18 343/700 MS |
| 2008/0214128 A1* | 9/2008 | Lim | H04B 7/061 455/101 |
| 2009/0231225 A1* | 9/2009 | Choudhury | H01Q 3/26 343/770 |
| 2013/0147664 A1* | 6/2013 | Lin | H01Q 25/00 342/372 |
| 2013/0273858 A1* | 10/2013 | Sover | H01Q 21/061 455/73 |
| 2013/0293420 A1* | 11/2013 | Yehezkely | H01Q 21/061 342/372 |
| 2014/0253382 A1* | 9/2014 | Markish | H01Q 21/0025 342/385 |
| 2014/0266902 A1* | 9/2014 | Kamgaing | H01P 11/00 342/374 |
| 2014/0320344 A1* | 10/2014 | Sanderovich | H01Q 21/0025 342/372 |
| 2015/0010099 A1* | 1/2015 | Lin | H04B 7/0404 375/267 |
| 2015/0148098 A1* | 5/2015 | Grau Besoli | H04B 7/0617 455/553.1 |
| 2016/0006133 A1* | 1/2016 | Ganchrow | H01Q 1/24 343/879 |
| 2016/0218426 A1* | 7/2016 | Kelly | H01Q 3/24 |
| 2016/0248169 A1* | 8/2016 | Mohammadian | H01Q 21/065 |
| 2017/0012359 A1* | 1/2017 | Jung | H01Q 3/30 |
| 2017/0222316 A1* | 8/2017 | Mizunuma | H01Q 1/38 |
| 2017/0222333 A1* | 8/2017 | Sudo | H01Q 1/38 |
| 2017/0237154 A1* | 8/2017 | Choudhury | H01Q 1/246 343/824 |
| 2018/0076526 A1* | 3/2018 | Garcia | H01Q 9/0407 |

OTHER PUBLICATIONS

Luther J., et al., "A Microstrip Patch Electronically Steerable Parasitic Array Radiator (ESPAR) Antenna with Reactance-Tuned Coupling and Maintained Resonance", IEEE Transactions on Antennas and Propagation, vol. 60, No. 4, Apr. 2012, pp. 1803-1813.

* cited by examiner

ANTENNA ARRAYS FOR COMMUNICATIONS DEVICES

CROSS-REFERENCE TO RELATED APPLICATION

This application claims the benefit of the filing date of Provisional Application Ser. No. 62/210,131, filed on Aug. 26, 2015, and entitled, "Antenna Arrays for Communications Devices," which is incorporated herein by reference.

FIELD

Aspects of the present disclosure relate generally to wireless communications devices, and more particularly, to antenna array designs for wireless communications devices.

BACKGROUND

In 60 GHz radio band communications devices, the radio modules typically consist of a series of printed antennas being fed by supporting circuitry including amplitude and phase shifters. In operation, these amplitude and phase shifters in the supporting circuitry are controlled to provide beamforming, i.e., to create focused beams between devices, which is required for high data rate communications in the 60 GHz radio band.

The need for beamforming in 60 GHz communications therefore makes important to find the optimal antenna configuration for the best antenna gain. For example, in the case of an Access Point (AP) or other such system, an optimal illumination is needed to ensure that high data rate communications are supported regardless of the position of the AP relative to communicating device. Further, high gain is typically needed, as the communicating device will typically provide a significant weaker signal than the AP and will typically have an antenna size significantly smaller than that of the AP. Thus, an AP may need to support a wide range of power levels to be used in different locations and to provide the high transmit and receive gains needed.

Traditionally, the method for maximizing gain in an AP or a similar device is to configure the AP to have a large single facing antenna array to provide a maximum gain normal to the face of the array. However in the case of an AP or similar application, such a configuration is inefficient. In particular, such a configuration results in an antenna gain greatest at angles normal to the face of the array and that quickly fall off at larger off angles.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Aspects of the present disclosure provide an apparatus for wireless communications. The apparatus generally includes a substrate, a plurality of first antennas disposed in the substrate, and a plurality of second antennas disposed in the substrate. In the apparatus, each of the plurality of first antennas is configured to have a peak gain in one or more first directions substantially perpendicular to the substrate and each of the plurality of second antennas is configured to have a peak gain in one or more second directions substantially diverging from the first directions. The apparatus may also include a plurality of gain amplifiers associated with the plurality of first antennas and the plurality of second antennas, and at least one processing system. The processing system can be configured to determine a subset of the plurality of first antennas and the plurality of second antennas contributing to a communications session and reducing power for the plurality of gain amplifiers not in the subset.

Aspects of the present disclosure provide a method for wireless communications. The method generally includes the steps of providing a substrate, disposing a plurality of first antennas in the substrate, disposing a plurality of second antennas in the substrate. The method also includes configuring each of the plurality of first antennas to have a peak gain in one or more first directions substantially perpendicular to the substrate and configuring each of the plurality of second antennas to have a peak gain in one or more second directions substantially diverging from the first directions. The method may include the steps of providing a plurality of gain amplifiers associated with the plurality of first antennas and the plurality of second antennas, determining a subset of the plurality of first antennas and the plurality of second antennas contributing to the communications session and reducing power for those gain amplifiers not associated with the subset.

Aspects of the present disclosure provide an apparatus for wireless communications. The apparatus generally includes a substrate and a plurality of first means for radiating and receiving electromagnetic signals, each of the plurality of first means disposed in the substrate and configured to provide a peak gain in one or more first directions substantially perpendicular to the substrate. The apparatus also generally includes a plurality of second means for radiating and receiving electromagnetic signals, each of the plurality of second means disposed in the substrate and configured to provide a peak gain in one or more second directions substantially diverging from the first directions. The apparatus may also include a plurality of amplifying means associated with the plurality of first means and the plurality of the second means, means for determining a subset of the plurality of first means and the plurality of second means contributing to a communications session, and means for reducing power for the amplifying means not associated with the subset.

Aspects of the present disclosure provide a wireless node. The wireless node generally includes a substrate, a plurality of first antennas disposed in the substrate, and a plurality of second antennas disposed in the substrate. The wireless node also generally includes a processing system configured to generate data and a transmitter configured to transmit the data via any of the plurality of plurality of first antennas or any of the plurality of plurality of second antennas. In the wireless node, each of the plurality of first antennas is configured to have a peak gain in one or more first directions substantially perpendicular to the substrate and each of the plurality of second antennas is configured to have a peak gain in one or more second directions substantially diverging from the first directions.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
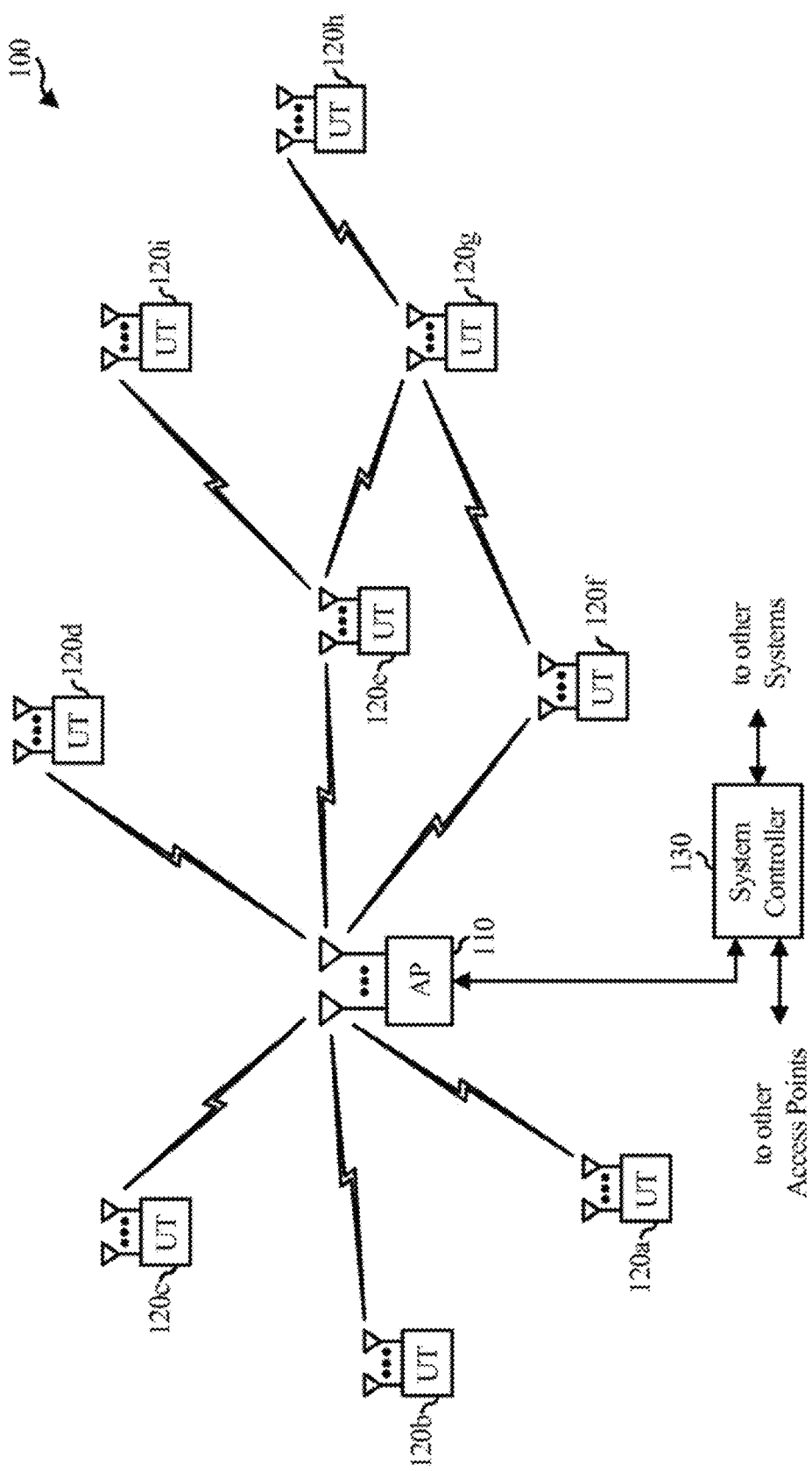
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The present disclosure is related to an antenna array design for Access Point (AP) devices and other similar devices, as shown below. For convenience, this improved patch antenna design will be described in the context of an AP device implementation of this antenna design. However, it is understood that techniques described herein may have other applications, as will be explained further below.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal. A wireless node may provide, for example, connectivity for or to a network (e.g., a wide area network such as the Internet or a cellular network) via a wired or wireless communications link.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium.

An Example Wireless Communications System

The techniques described herein may be used for various broadband wireless communications systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system and Single-Carrier Frequency Division Multiple Access (SC-FDMA) systems. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal. A wireless node may provide, for example, connectivity for or to a network (e.g., a wide area network such as the Internet or a cellular network) via a wired or wireless communications link.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium.

FIG. 1 illustrates an example wireless communications system in which aspects of the present disclosure may be practiced. For example, AP 110 may be configured to generate and transmit a frame having one or more bits that indicate both minimum and maximum bandwidths for communicating in a network. UT 120 may be configured to obtain (e.g., receive) the frame and determine, based on the one or more bits in the frame, both the minimum and maximum bandwidths for communicating in the network.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, a user equipment, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
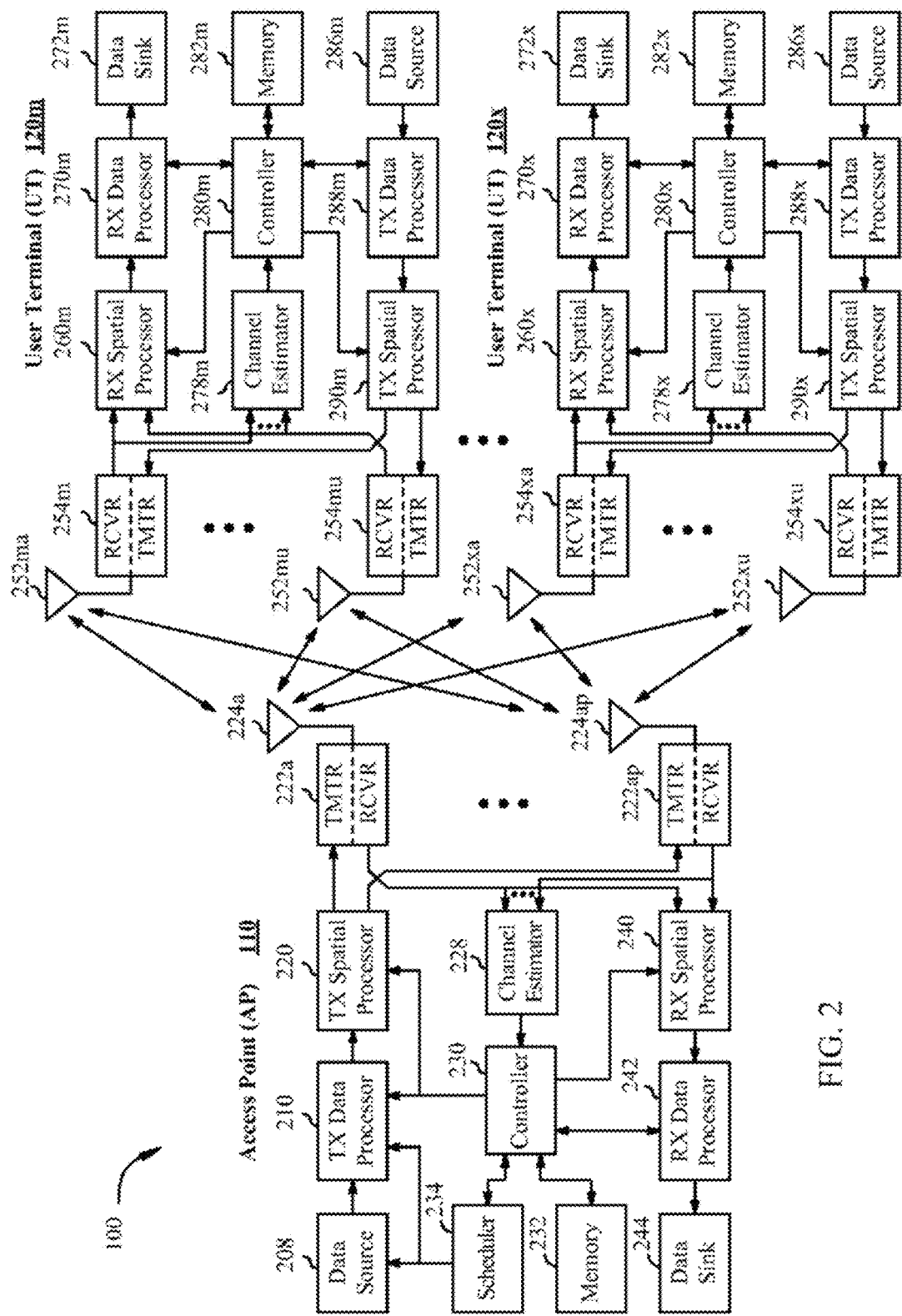
FIG. 2 illustrates a block diagram of an example access point and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, processors 210, 220, 240, 242, and/or controller 230 may be used to perform the operations described herein. Similarly, antenna 252, Tx/Rx 254, processors 260, 270, 288, and 290, and/or controller 280 may be used to perform the operations described herein.

FIG. 2 illustrates a block diagram of access point 110 and two user terminals 120m and 120x in MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal. The decoded data for each user terminal may be provided to a data sink 272 for storage and/or a controller 280 for further processing.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
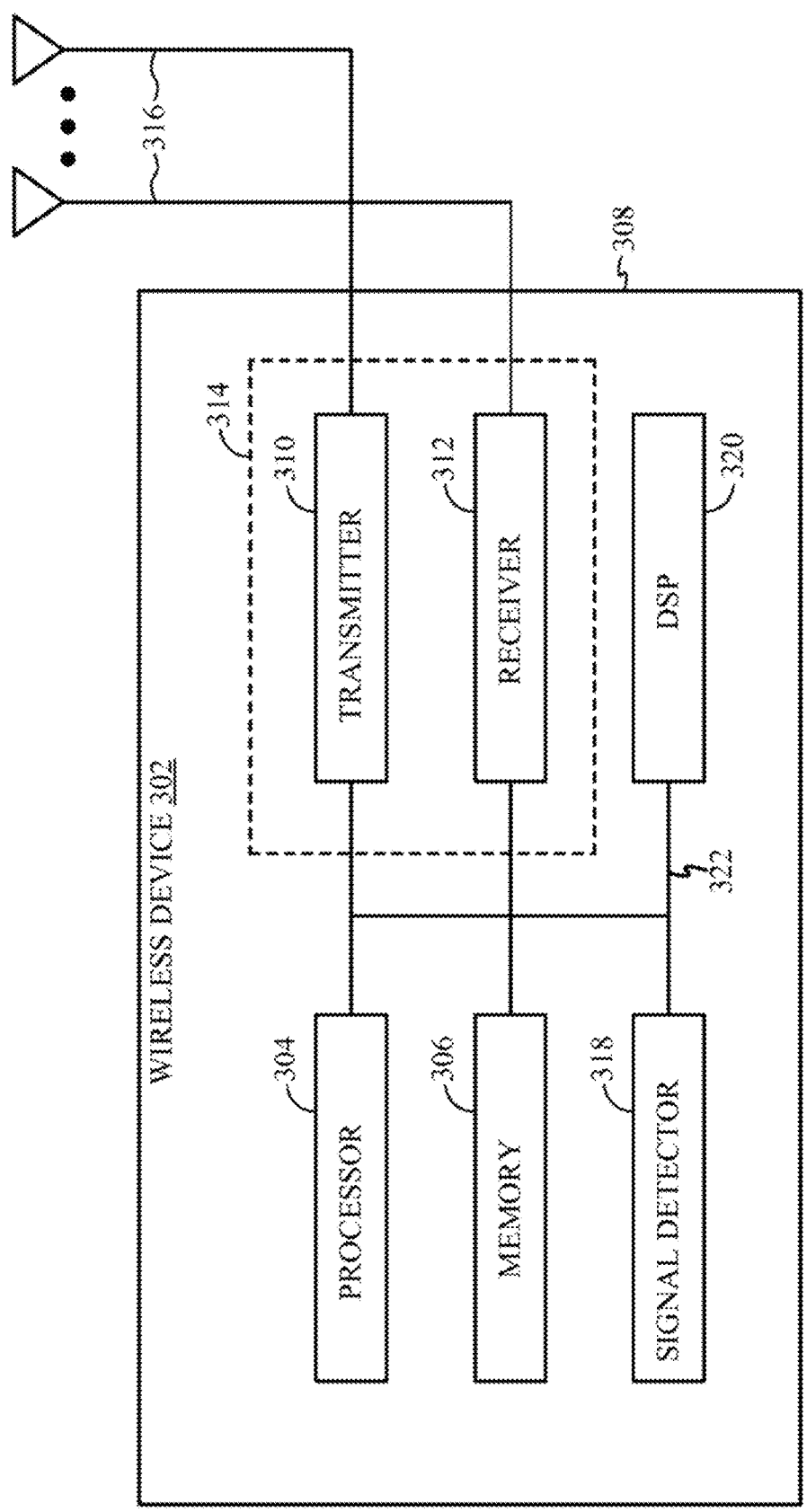
FIG. 3 illustrates a block diagram of an example wireless device, in accordance with certain aspects of the present disclosure.

FIG. 3 illustrates example components that may be utilized in the AP 110 and/or UT 120 to implement aspects of the present disclosure. For example, the transmitter 310, antenna(s) 316, processor 304 and/or the DSP 320 may be used to practice aspects of the present disclosure implemented by the AP. Further, the receiver 312, antenna(s) 316, processor 304 and/or the DSP 320 may be used to practice aspects of the present disclosure implemented by the UT.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Antenna Array Design

Figure 4A:
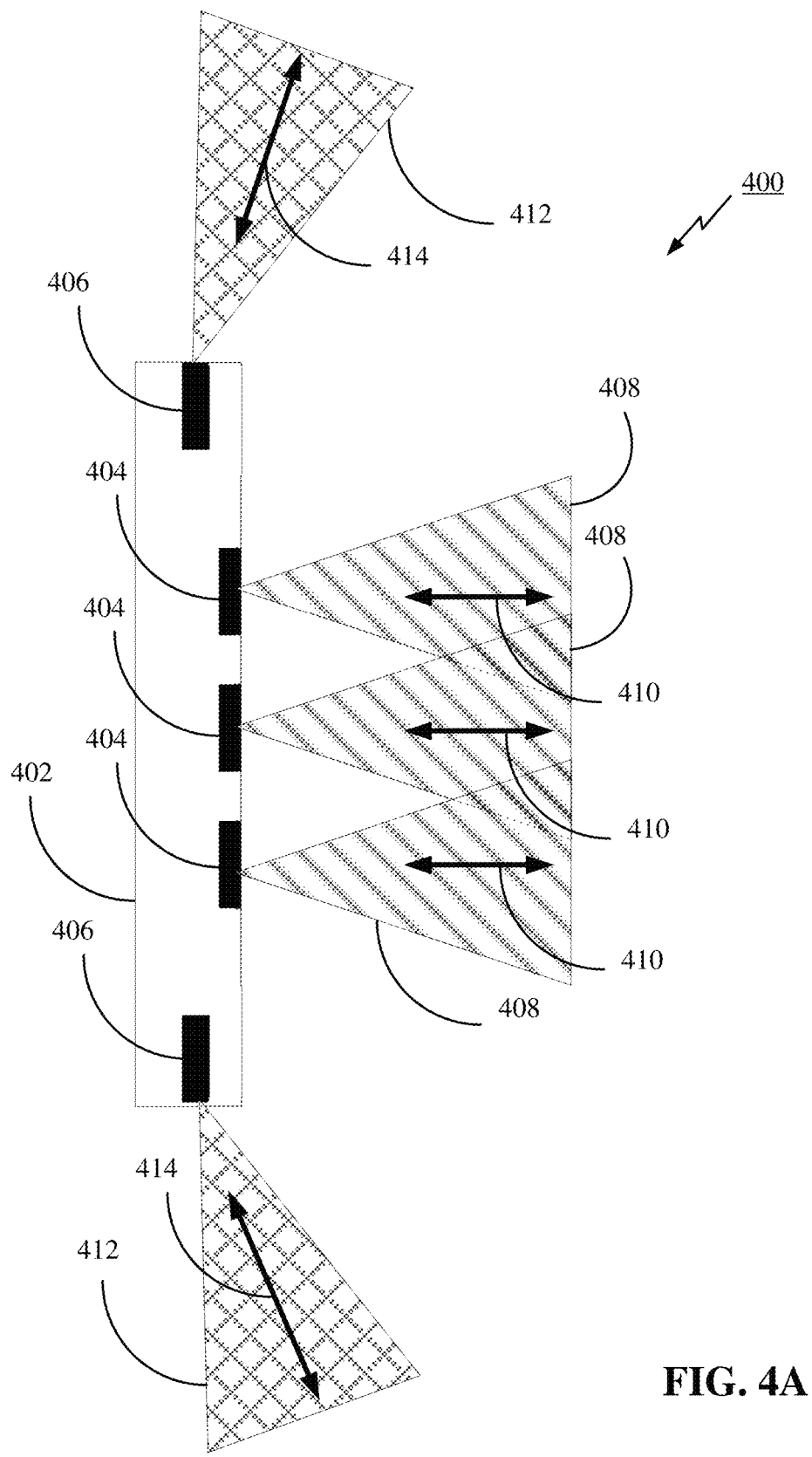
FIGS. 4A and 4B show a partial cross-section side view and a bottom view, respectively, of an apparatus for wireless communications according to an aspect of the present disclosure.
Figure 4B:
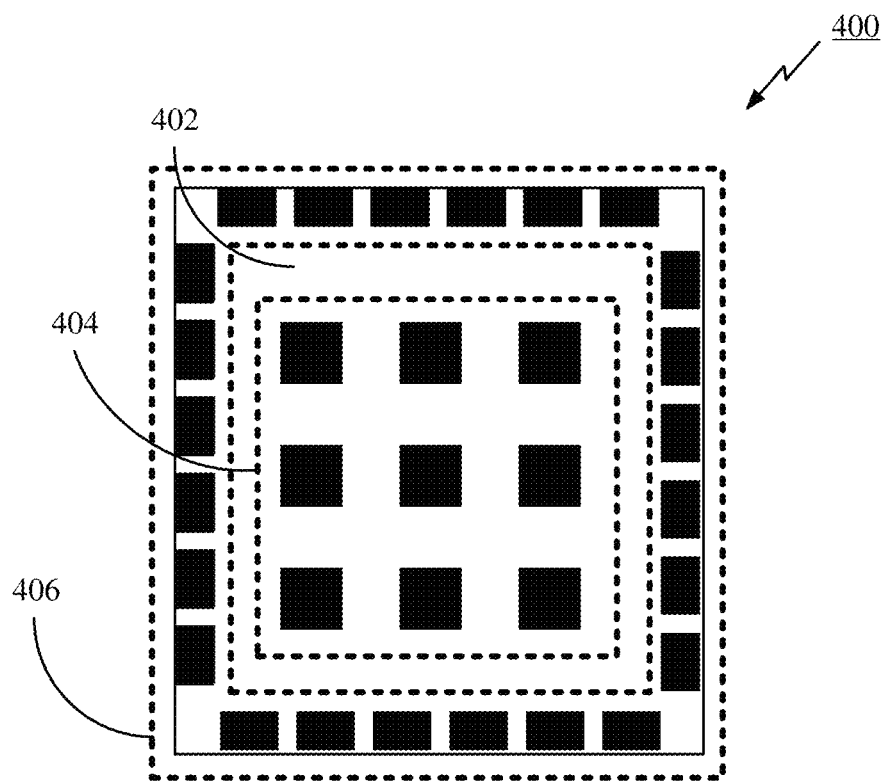

To provide a better foundation for understanding the various aspects of the present disclosure, reference is first made to FIGS. 4A and 4B which illustrate an implementation of an antenna array design according to an aspect of the present disclosure.

FIGS. 4A and 4B, show a partial cross-section side view and a bottom view, respectively, of an apparatus for wireless communications 400, such as a radio module or other wireless communications device, according to an aspect of the present disclosure. As shown in FIGS. 4A and 4B, the apparatus for wireless communications 400 includes a substrate 402, first antennas 404 defining a first array that is forward facing, as described in greater detail below, and second antennas 406 defining a second array that is side facing, as described in further detail below. Other components (not shown, but described in further detail below) for supporting communications using the first antennas 404 and the second antennas 406 may be incorporated into apparatus for wireless communications 400 or into another module connected to apparatus for wireless communications 400. In some aspects, the elements 402, 404, and 406 may be formed, i.e., printed, using printed circuit board (PCB) techniques. Thus, these components may be printed by forming vias, lines, traces, etc., according to PCB techniques. In other aspects, such as in the case of non-PCB technologies, such features may be formed using techniques appropriate for such non-PCB technologies.

As shown in FIG. 4A, the substrate 402 is illustrated as being a substantially planar structure. As used herein, unless otherwise stated, the term "substantially planar substrate" means a substrate with lateral or major surfaces that vary in height by 20% or less across the substrate with respect to a lateral plane for the substrate. Thus, the substrate 402 would be "substantially planar" even if lateral or major surfaces vary in height by 5%, 10%, 15, or even 20% with respect to a lateral plane for the substrate However, in other aspects the substrate 402 need not be substantially planar. Thus, the substrate 402 may be configured to simply be applanate. That is, a structure that extends primarily in lateral or horizontal directions in space that are parallel to the lateral plane. Thus, in some aspects, the substrate 402 may be completely or partially curved or may include features that protrude or jut out from the substrate 402. However, in certain aspects, a substantially planar configuration for substrate 402 may be advantageous for inclusion in devices with limited space for components.

As noted above, the apparatus for wireless communications includes at least two antenna arrays. The first antennas 404 define a first antenna array that is forward facing. That is, these antennas are configured to have radiation patterns 408 with a peak gain in directions 410 that are substantially perpendicular to the substrate 402. As used herein, the term "substantially perpendicular direction" means being within about 20% of the identified perpendicular direction. Thus, directions 410 need not be perfectly perpendicular to the surface of the substrate 402 or a lateral plane associated with the substrate 402. Rather, the directions can be offset by or be angles of, for example, 5, 10, 15, or even 20 degrees with respect to a perpendicular direction and still be considered substantially perpendicular. The present disclosure also contemplates that different ones of antennas 404 may have offsets different amounts.

In some aspects, the radiation patterns 408 for the first antennas 404 may be selected by placement and/or design of the first antennas 404. For example, in some aspects, each of first antennas 404 may be a patch antenna may be formed in substrate, with the patch and the ground plane oriented parallel to the substrate 402. Such a patch antenna would provide a radiation pattern with a peak gain in a direction substantially perpendicular to the patch, and thus substantially perpendicular to the substrate. However, it should be noted that the present disclosure contemplates that other types of antennas may also be used for the first antennas 404. For example, dipole antennas, folded monopole antennas, slot antennas, horn antennas, or inverted-F antennas with the desired radiation pattern may be used, to name a few. Further, the present disclosure contemplates that the first antennas need not be identical. Rather, any combination of suitable antennas may be used.

In addition, the second antennas 406 define a second antenna array that is side facing. That is, these antennas are configured to have radiation patterns 412 with a peak gain in directions 414 that substantially diverge or are offset from directions 408. That is, directions 414 are not substantially perpendicular to the substrate 402. Thus, this would include directions that are offset by or be at angles of more than 20 degrees with respect to the perpendicular direction, including offsets or angles of 45 degrees or even 90 degrees with respect to the perpendicular direction. Alternatively stated, the directions 414 can be substantially parallel to the lateral plane of the substrate 402, i.e., offset by or angles of have 0 degree to 20 degrees with respect to the lateral plane, or can be offset from the lateral plane by even more, such as, for example, 25, 45, 65, or even 75 degrees. The present disclosure also contemplates that different ones of antennas 404 may have offsets different amounts.

Further directions 414 point towards the edges of the substrate 402. In some aspects, the directions 414 may be substantially parallel to the substrate. As with the first antennas 404, the radiation patterns 412 for the second antennas 406 may be selected by placement and/or design of the second antennas 406. For example, in some aspects, each of second antennas 406 may be a half wavelength patch antenna formed in substrate, with the patch and the ground plane oriented parallel to the substrate 402. Such a patch antenna would provide a radiation pattern with a peak gain not only in a direction perpendicular to the patch, but also in a direction parallel to the substrate. In another aspect, a dipole antenna could be used. However, it should be noted that the present disclosure contemplates that other types of antennas may also be used for the second antennas 406. For example, dipole antennas, folded monopole antennas, slot antennas, horn antennas, or inverted-F antennas with the desired radiation pattern may be used, to name a few. Further, the present disclosure contemplates that the second antennas 406 need not be identical. Rather, any combination of suitable antennas may be used.

The net result of this configuration is that in addition to providing forward facing radiation patterns 408, the apparatus for wireless communications 400 also provides side facing radiation patterns 412. Accordingly, illumination of a larger area is possible since the apparatus for wireless communications 400 is no longer limited to illuminating an area using only forward facing radiation patterns.

In FIGS. 4A and 4B, the directions 414 for the second antennas 406 are illustrated as having substantially a same amount of offset with respect to the lateral directions that the substrate 402 extends in. However, in other aspects, different ones of the second antennas may have different amounts of such offset. Such a configuration may improve illumination of an area by increasing the number of directions associated with the antennas. In a similar fashion, additional arrays of side facing antennas may be provided with different directions to achieve similar results.

As shown in FIG. 4A, the first antennas 404 and the second antennas 406 are illustrated as being at different levels within the substrate 402. However, in other aspects, these antennas may be within the same level of the substrate to facilitate fabrication and utilize common elements, such as a common ground plane.

Further, as shown in FIG. 4B, the apparatus for wireless communications 400 may be configured in some aspects such that the first antennas 404 are in a portion of the substrate 402 that is surrounded by the second antennas 406. Such a configuration may be provided to provide an overlap, without any interference, between the radiation patterns 408 of first antennas 404 and the radiation patterns 412 of second antennas 406 to improve overall gain. However, the present disclosure contemplates that any other arrangement of first antennas 404 and second antennas 406, with respect to each other, may be provided.

Now turning to FIGS. 5, 6, 7, and 8, there are provided some exemplary arrangements for an apparatus for wireless communications according to some aspects. Although FIGS. 5, 6, 7, and 8 will be discussed with particular implementation details, these exemplary arrangements are provided solely for illustrating the various aspects of the present disclosure. That is, the present disclosure contemplates other arrangements including more components than shown, less components than shown, or different components that shown.

Figure 5:
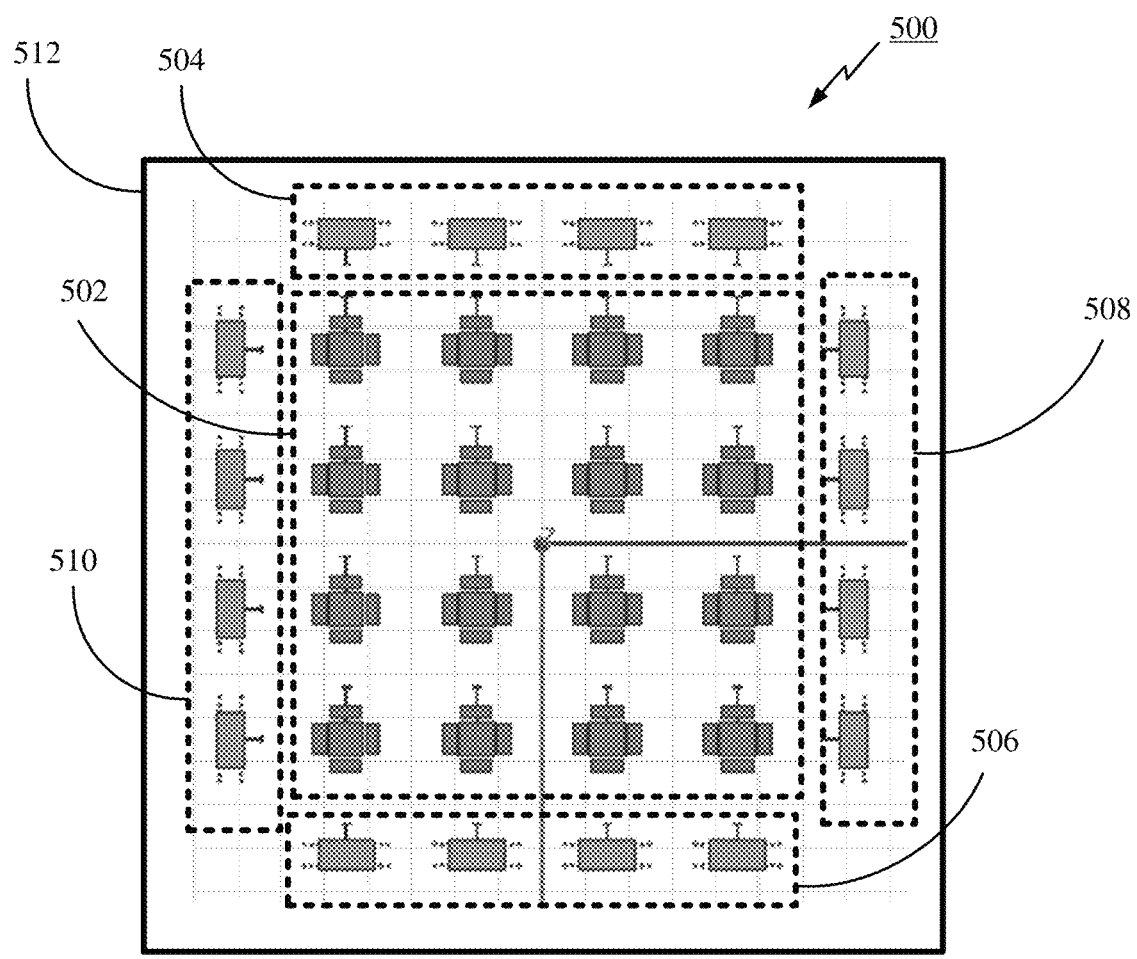
FIG. 5 shows a first exemplary arrangement of antenna elements according to an aspect of the present disclosure.

FIG. 5 shows a first exemplary arrangement for an apparatus for wireless communications 500 according to an aspect of the present disclosure. As shown in FIG. 5, the apparatus for wireless communications 500 consists of a group of antennas 502 surrounded by other groups of antennas 504, 506, 508 and 510. These antennas are formed on a substantially planar substrate 512. Similar to the configuration in FIGS. 4A and 4B, the surrounded group of antennas 502 is configured as a forward facing group of antennas. In particular, as illustrated in FIG. 5, each antenna from the group of antennas 502 is a patch antenna. Further, the group of antennas 502 is arranged in a 4×4 pattern of antennas on substrate 512. Each of other groups of antennas 504, 506, 508, and 510 are configured as side-facing antennas, such that their respective radiation patterns have a peak gain in a direction away from group of antennas 502; for example, in a direction substantially parallel to substrate 512. In particular, as illustrated in FIG. 5, each antenna from groups 504, 506, 508, and 510 is a half wavelength patch antenna. As shown in FIG. 5, each of groups 504, 506, 508, and 510 is arranged as a single row of antennas adjacent to group of antennas 502.

Figure 6:
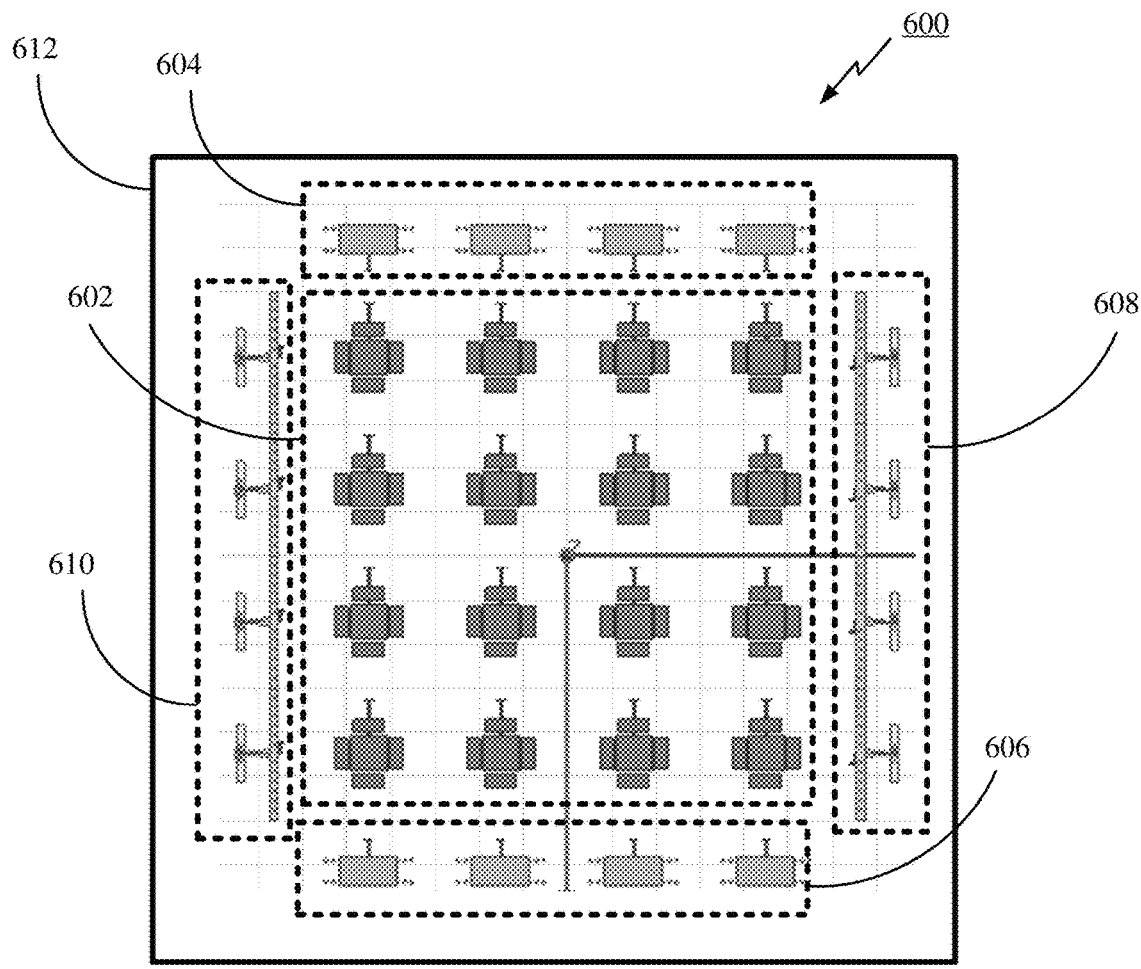
FIG. 6 shows a second exemplary arrangement of antenna elements according to an aspect of the present disclosure.

As noted above with respect to FIGS. 4A and 4B, it is not necessary for all of the side facing antennas to be identical. This is illustrated in FIG. 6, which shows a second exemplary arrangement of an apparatus for wireless communications 600 according to an aspect of the present disclosure. Apparatus for wireless communications 600 is configured substantially the same as apparatus for wireless communications 500, accordingly, the discussion of components 502, 504, 506, 508, 510, and 512 above with respect to FIG. 5 is sufficient for describing components 602, 604, 606, 608, 610, and 612 in FIG. 6, except as noted below. In contrast to FIG. 5, the side facing antennas of FIG. 6 are not identical. In particular, groups of antennas 604 and 606 are configured as quarter-wave patch, also known as shorted half patch, while groups of antennas 608 and 610 are configured as dipole antennas. Such a configuration is provided so that all of the antennas will be co-polarized in the farfield so as to allow coherent combination for maximum gain.

Figure 7:
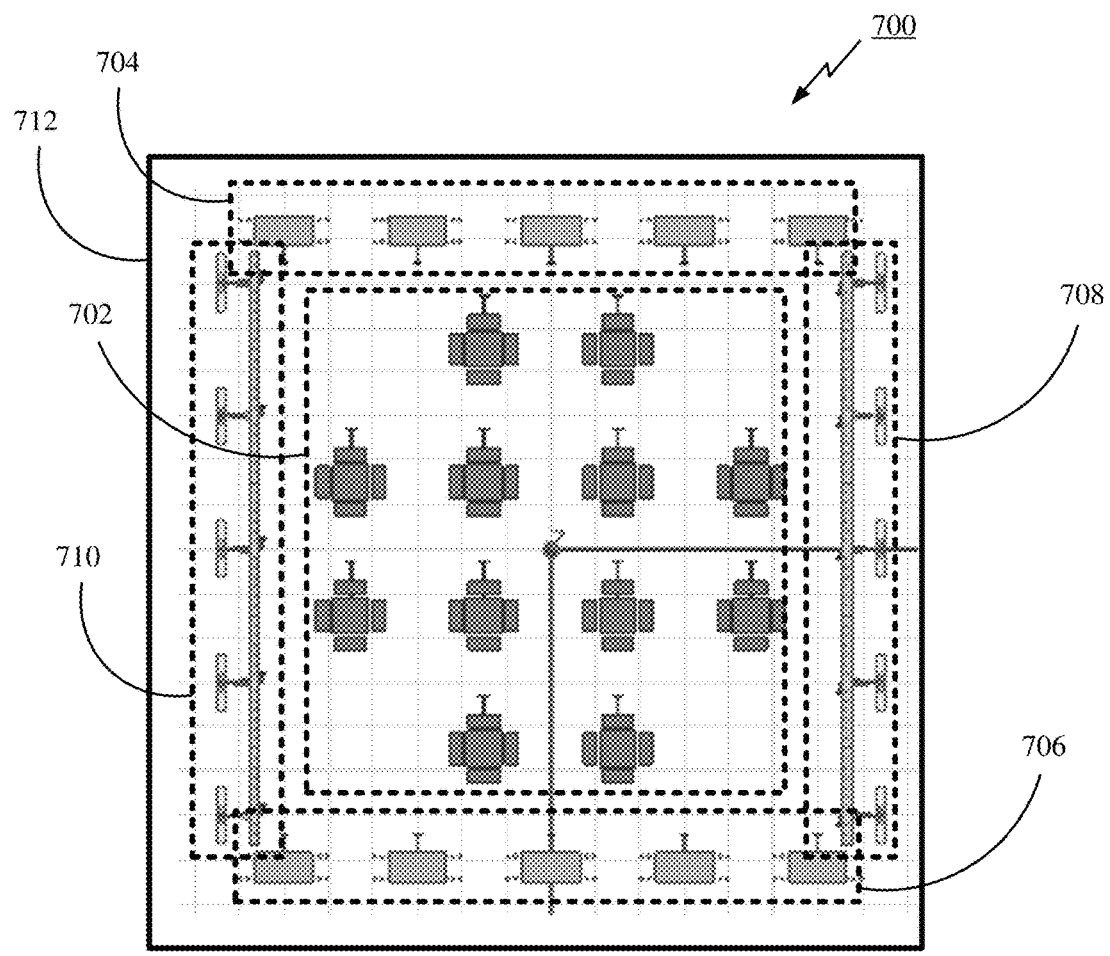
FIG. 7 shows a third exemplary arrangement of antenna elements according to an aspect of the present disclosure.

As also noted above with respect to FIGS. 4A and 4B, the arrangement of the forward facing antennas may vary. This is illustrated in FIG. 7, which shows a second exemplary arrangement of an apparatus for wireless communications 700 according to an aspect of the present disclosure. Apparatus for wireless communications 700 is configured substantially the same as apparatus for wireless communications 600, accordingly, the discussion of components 602, 604, 606, 608, 610, and 612 in FIG. 6 is sufficient for describing components 702, 704, 706, 708, 710, and 712 in FIG. 7, except as noted below. In contrast to FIG. 6, the front facing antennas of FIG. 7 are not arranged in an N×M pattern. In particular, group of antennas 702 is arranged in a double wide cross pattern. That is, each line or limb of the cross pattern is two antennas wide. Such a configuration may be used in apparatus for wireless communications where a reduced number of forward facing antennas are sufficient to illuminate the area of interest and/or where a lower use of power is preferred.

Figure 8:
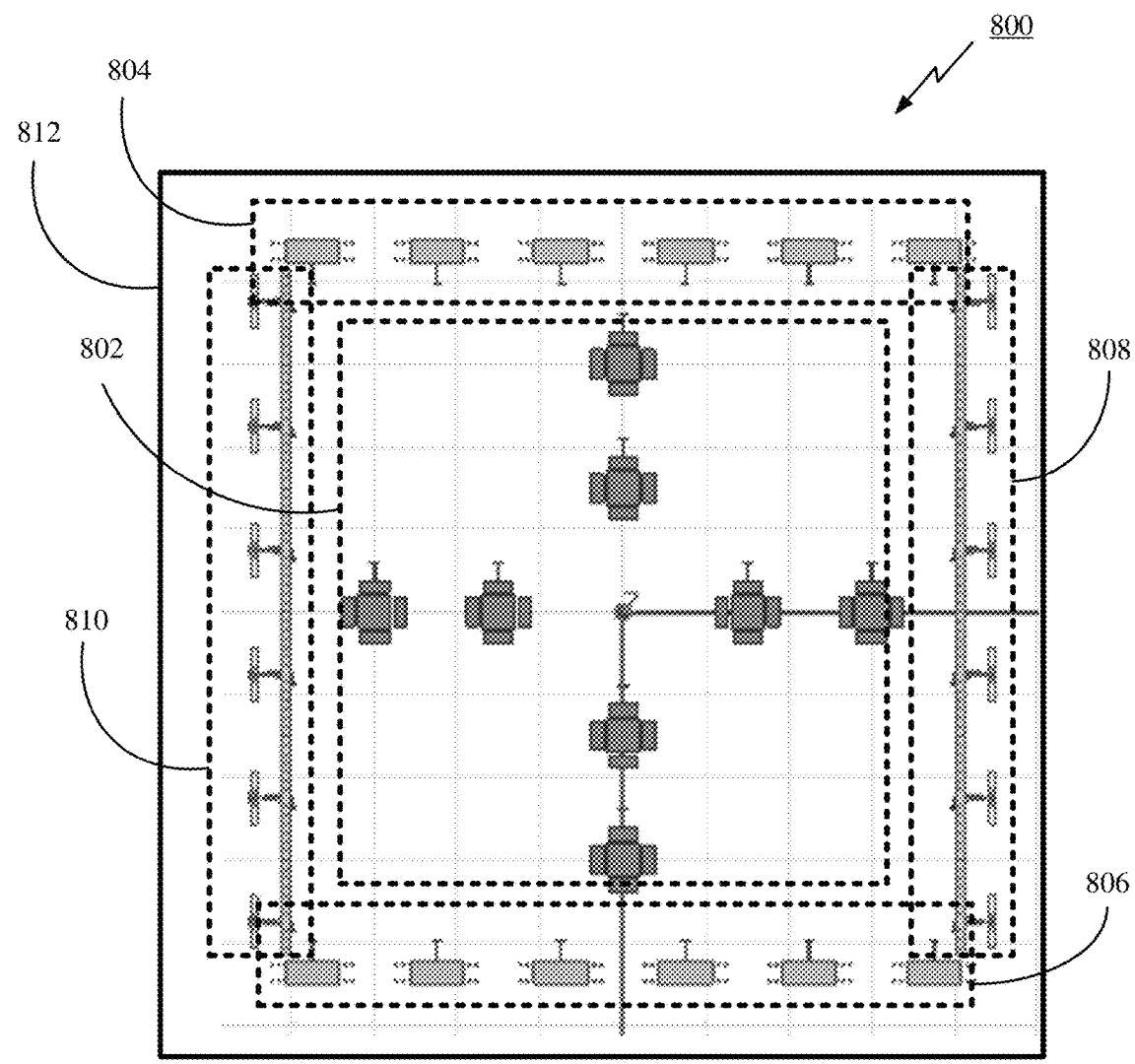
FIG. 8 shows a fourth exemplary arrangement of antenna elements according to an aspect of the present disclosure.

In some aspects, the number of antennas may be reduced further, as shown in FIG. 8. FIG. 8 shows a fourth exemplary arrangement of an apparatus for wireless communications 800 according to an aspect of the present disclosure. Apparatus for wireless communications 800 is configured substantially the same as apparatus for wireless communications 700, accordingly, the discussion of components 702, 704, 706, 708, 710, and 712 in FIG. 7 is sufficient for describing components 802, 804, 806, 808, 810, and 812 in FIG. 8, except as noted below. In contrast to FIG. 7, the number of front facing antennas of FIG. 8 is further reduced. In particular, group of antennas 802 is arranged in a single wide cross pattern. That is, each line or limb of the cross pattern is one antenna wide. Such a configuration may be used in apparatus for wireless communications where a reduced number of forward facing antennas are sufficient to illuminate the area of interest and/or where a lower use of power is preferred.

Figure 9:
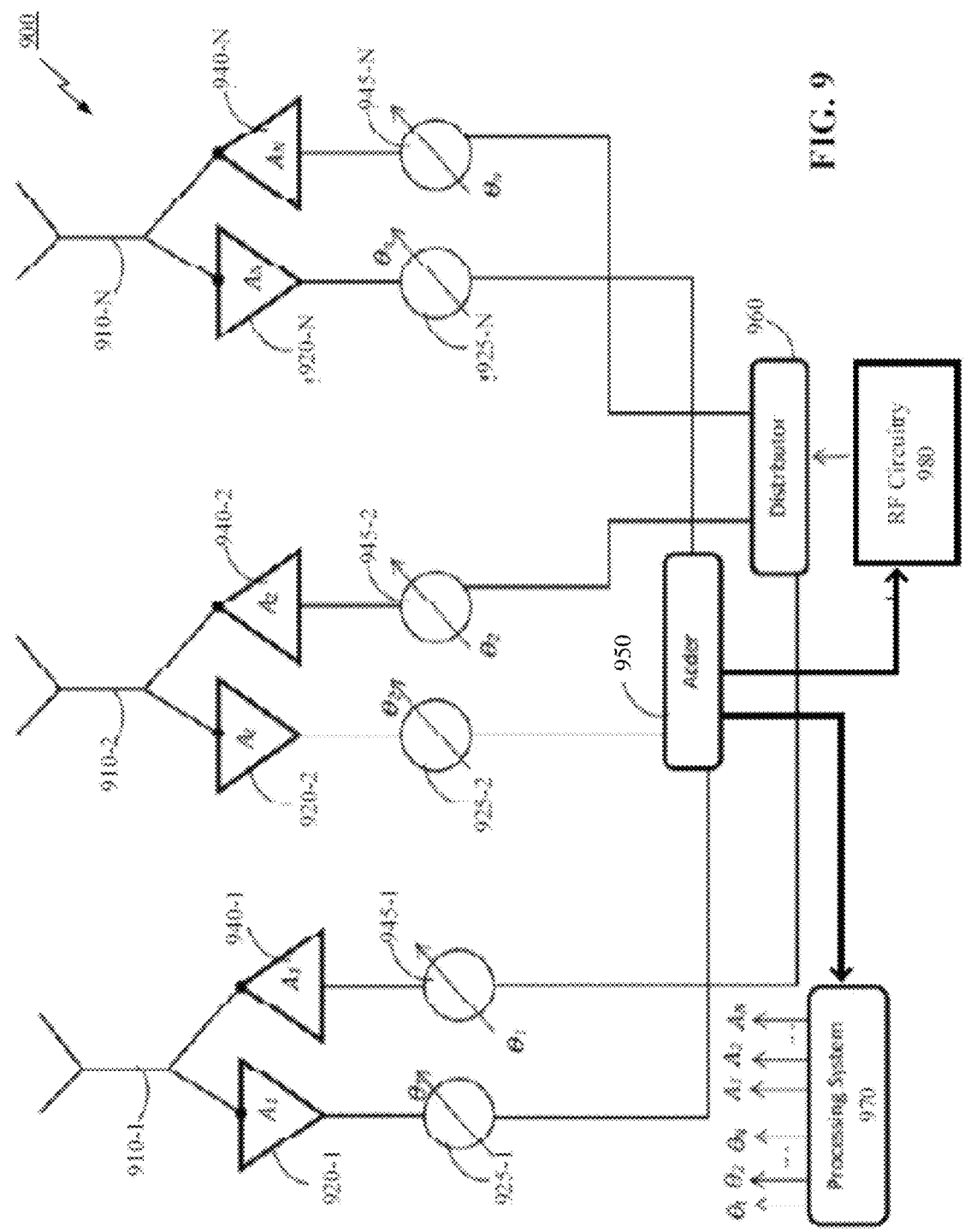
FIG. 9 is a schematic diagram of an exemplary configuration for operating an array in an apparatus for wireless communications according to an aspect of the present disclosure.

As noted above with respect to FIGS. 4A and 4B, the antennas described therein may be associated with supporting components. An exemplary configuration of an antenna array and supporting components is illustrated in FIG. 9. FIG. 9 is a schematic diagram of an exemplary configuration of an antenna array 900, including its supporting components, according to an aspect of the present disclosure. Although FIG. 9 and FIGS. 1-3 substantially overlap, FIG. 9 is presented for ease of illustration. Accordingly, FIGS. 1, 2, 3, and 9 should be interpreted as presenting various features of the same or different wireless communications devices. In one aspect, the antenna array may be either the forward facing array or the side facing array(s), as discussed above with respect to FIGS. 4A-8. In another aspect, the antenna array may contain both the forward facing array and the side facing array(s) discussed above with respect to FIGS. 4A-8.

The antenna array 900 includes a number N of antennas or radiating elements 910-1 through 910-N, each of which is designed to receive and transmit signals. For example, mm-wave signals over the 90 GHz frequency band. As noted above with respect to FIGS. 1A-5, the radiating elements 910-1 through 910-N may be constructed using different type of antenna elements. For example, a first set of radiating elements may be dipole, while a second set of radiating elements may be patch antennas.

In the receive direction, the radiating elements 910-1 through 910-N are respectively connected to low noise amplifiers (LNAs) 920-1 through 920-N (hereinafter referred to collectively as LNAs 920 or individually as LNA 920, merely for the sake of simplicity and without restriction on the disclosed aspects) and phase shifters 925-1 through 925-N (hereinafter referred to collectively as phase shifters 925 or individually as a phase shifter 925, merely for the sake of simplicity and without restriction on the disclosed aspects), and are further connected to an adder component 950 that sums the received signals and forwards them to RF circuitry 980 for processing.

In the transmit direction, the radiating elements 910-1 through 910-N are respectively connected to power amplifiers (PAs) 940-1 through 940-N (hereinafter referred to collectively as power amplifiers 940 or individually as a power amplifier 940, merely for the sake of simplicity and without restriction on the disclosed aspects) and to phase shifters 945-1 through 945-N (hereinafter referred to collectively as phase shifters 945 or individually as a phase shifter 945), and are further connected to a distributor 960 that distributes an incoming RF signal from the RF circuitry 980 to the radiating elements.

According to the disclosed aspects, the phase $\theta_i$ of each phase shifter 925 or 945 is individually or independently controlled during the reception or transmission of signals. In addition, the gain $A_i$ of each of the LNAs 920 or PAs 940 are independently controlled during the reception or transmission of signals. Thus, according to the disclosed aspects, the gains and phases ($A_i$; $\theta_i$, i=1, ..., N) of the signal feeds to the elements are individual controlled.

In an aspect, the controllable components, i.e., the amplifiers 920 and 940 and the phase shifters 925 and 945 are controlled by a processing system 970. The processing system 970 may be configured to operate the antenna 900 by adjusting feed gains and phases of the signals received from and transmitted to the elements 910.

The processing system 970 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information.

The processing system 970 may also include computer-readable or machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

In one aspect, the processing system 970 may be integrated into the RF circuitry 980. In another aspect, the processing system 970 may be part of a baseband module of the AP device or similar device (not shown). Similarly, the adder 950 and/or the distributor 960 may also be integrated into the RF circuitry 980, a baseband module (not shown), other component.

One potential concern with an AP device, or other similar device, configured according to one or more aspects of the present disclosure is the amount of power utilized. That is, if a large number of antennas are provided in an AP, such as shown in FIGS. 4A-8, a significant amount of power may be utilized, even though the number of antenna actually involved in a communications session may only be a small subset of these antennas. Accordingly, the present disclosure also contemplates that in some aspects the power utilized by the antennas may be selectively adjusted to reduce overall power requirements. In particular, the present disclosure contemplates that in some aspects, the antennas significantly contributing to a communications session may be identified and power, i.e., a gain, for other antennas may be reduced or even cut. This is discussed below in further detail with respect to FIG. 10.

Figure 10:
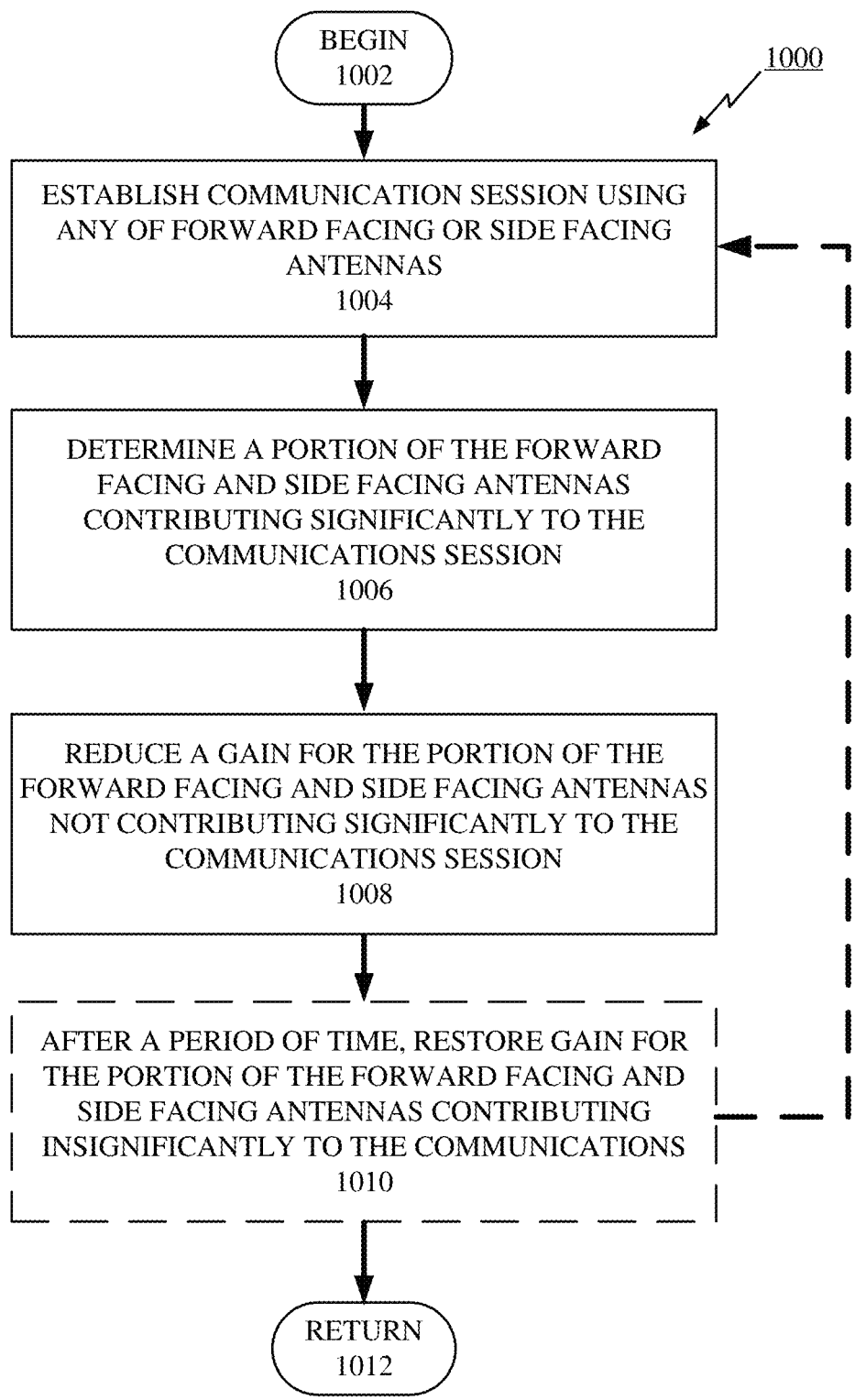
FIG. 10 is a flowchart of steps in a first exemplary method according to an aspect of the present disclosure.

FIG. 10 is a flowchart of steps in a first exemplary method 1000 according to an aspect of the present disclosure. Method 1000 begins at step 1002 and proceeds to step 1004. At step 1004, a communications session may be established using the forward facing or the side facing antennas. It should be noted that the present disclosure contemplates that two or more antennas may be involved in a communications session. Thereafter, at step 1006, a subset of the forward facing and side facing antennas contributing significantly to a communications session may be determined. In one aspect, steps 1004 and 1006 may involve configuring the adder 950 to communicate to the processing system 970 signals representing the relative strengths of the signals being received via antennas 910 and associated with a particular communications session. Thereafter, the processing system 970 may determine whether each of antennas 910 is contributing significantly or insignificantly to the communications session. For example, one or more threshold values may be specified to categorize a contribution of an antenna based on any criteria (e.g., signal strength, signal-to-noise ratio, error rates, etc.). In another example, a cluster or other statistical analysis may be performed to identify the antennas contributing significantly or insignificantly to the communications session based on any criteria. In still another example, the processing system 970 can monitor the operation of the power amplifiers 940 or LNAs 920 to identify the antennas contributing significantly or insignificantly to the communications session. For example, antennas requiring high amounts of gain may indicate antennas associated with extremely weak signals and thus may indicate antennas contributing insignificantly to the communications session. Thus, antennas may be identified contributing significantly or insignificantly to the communications session based on a threshold criteria for the gain. However, the present disclosure contemplates that various other methods for performing the determination at step 1006 may be used in other aspects.

Once the contributions of the antennas are determined at step 1006, the method may proceed to step 1008. At step 1008, a gain may then be reduced for the antennas that are not significantly contributing to the communications session. For example, gains for power amplifiers 940 or LNAs 920 may be reduced for the antennas identified at step 1006. Thereafter, the method may proceed to step 1012 and resume previous processing, including repeating method 1000.

In some aspects, prior to repeating method 1000, it may be useful to restore the gain for the various antennas. For example, in the case of an AP device, a new device may be trying to establish a communications session with the AP device. However, if the gains are reduced for one or more of the antennas, it may be difficult to establish the communications link. In another example involving an AP device, a device currently engaged in a communications session my change its position relative to the AP device. Accordingly, the previous gain configuration may be insufficient to maintain a reliable connection between the AP device and the other device. Therefore, in some aspects, after gains are selectively reduced at step 1008, the method may proceed to step 1010. At step 1010, the gain reduced at step 1008 may be restored after a period of time, i.e, periodically. The method 1000 may then proceed back to step 1004 and repeat method 1000 to ensure that the gains are correctly for the current needs of the communications session.

Figure 11:
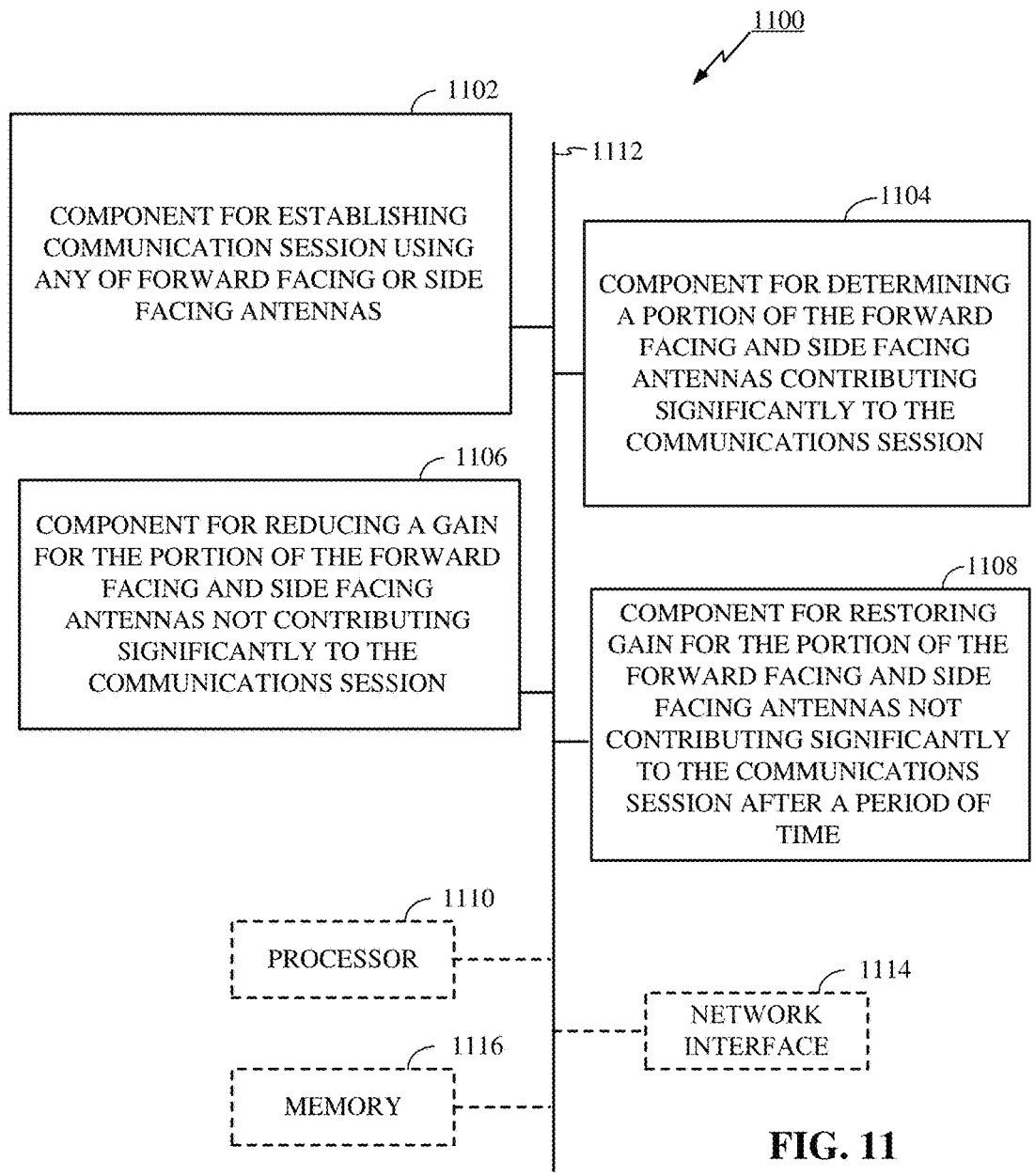
FIG. 11 illustrates an example apparatus for implementing the methodology of FIG. 10.

With reference to FIG. 11, there is provided an exemplary apparatus 1100 that may be configured as a wireless entity, such an AP device or other suitable entity, or as a processor, component or similar device for use within such as wireless entity. The apparatus 1100 may include functional blocks that may represent functions implemented by a processor, software, or combinations thereof (e.g. firmware), such as the functions set forth in FIG. 10.

As illustrated, in one embodiment, the apparatus 1100 may include an electrical component or module 1102 for establishing a communications session using any of the forward facing or side facing antennas. The apparatus 1100 may also include an electrical component or module 1104 for determining a subset of the forward facing antennas and the side facing antenna not contributing significantly to a communications session. The apparatus 1100 may include an electrical component or module 1106 for reducing a gain for the subset of the forward facing antennas and the side facing antenna contributing insignificantly to a communications session. The apparatus 1100 may also include an electrical component or module 1108 for after a period of time, restore gain for the subset of the forward facing and side facing antennas contributing insignificantly to the communications.

In related aspects, the apparatus 1100 may optionally include a processor component 1110 having at least one processor, in the case of the apparatus 1100 configured as a network entity. The processor 1110, in such case, may be operative communication with the components 1102-1106 or similar components via a bus 1112 or similar communication coupling. The processor 1110 may effect initiation and scheduling of the processes or functions performed by electrical components or modules 1102-1106.

In further related aspects, the apparatus 1100 may include a network interface component 1114 for communicating with other network entities. The apparatus 1100 may optionally include a component for storing information, such as, for example, a memory device/component 1116. The computer readable medium or the memory component 1116 may be operatively coupled to the other components of the apparatus 1100 via the bus 1112 or the like. The memory component 1116 may be adapted to store computer readable instructions and data for performing the activity of the components 1102-1106, and subcomponents thereof, or the processor 1110. The memory component 1116 may retain instructions for executing functions associated with the components 1102-1106. While shown as being external to the memory 1116, it is to be understood that the components 1102-1106 may exist within the memory 1116.

Figure 12:
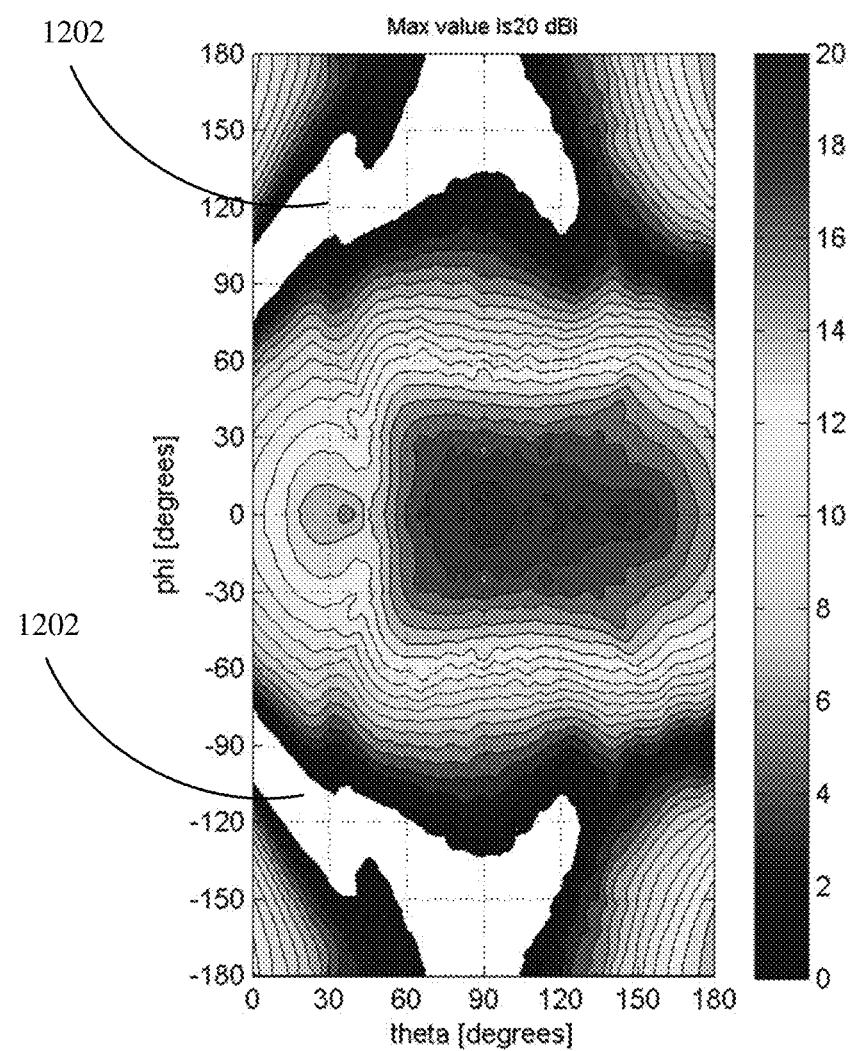
FIG. 12 shows a radiation pattern for an apparatus implementing forward facing antennas only.
Figure 13:
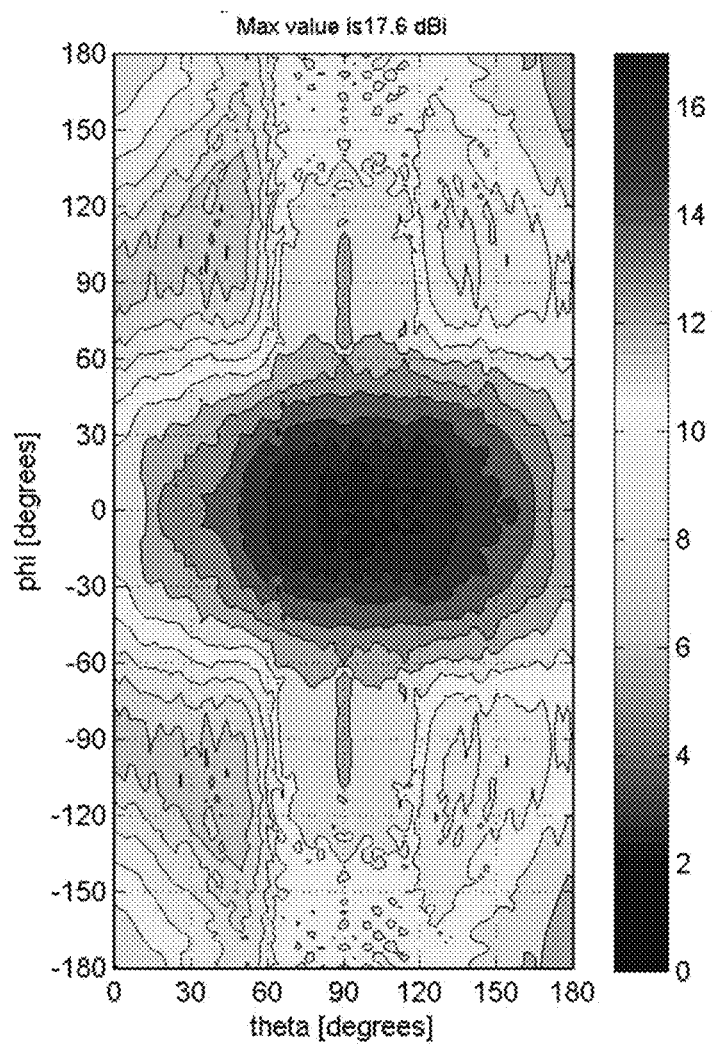
FIG. 13 shows a radiation pattern for an apparatus implemented in accordance with an aspect of the present disclosure.

Turing now to FIGS. 12 and 13, the results of utilizing a conventional forward facing array and an antenna array according to an aspect of the present disclosure are compared. FIG. 12 shows a radiation pattern for an apparatus implementing forward facing antennas only. FIG. 13 shows a radiation pattern for an apparatus implemented in accordance with an aspect of the present disclosure.

In particular, FIG. 12 illustrates a scan map of intensity as a function of angle ($\theta$, $\phi$) for a variety of angles ($\theta$=0°-180°, $\phi$=−180°-180°). As can be observed from FIG. 12, at certain combinations of angles the intensity immediately drops down to 0 dBi (e.g., areas 1202 of FIG. 12). As a result, a proper illumination cannot be provided at such angles. In contrast, as shown in FIG. 13, which also illustrates a scan map of intensity as a function of angle, no such "dead zones" exist when utilizing an apparatus implemented in accordance with an aspect of the present disclosure. That is, for the angles corresponding to areas 1202 in FIG. 12, at least a value approximately at 6 dBi is observed in FIG. 13. Accordingly, a configuration according to present disclosure enables illumination at substantially all angles.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations illustrated in FIG. 10 correspond to the means illustrated in FIG. 11.

Means for generating may include a processing system, which may include one or more processors, such as the processors 210, 242, and/or the controller 230 of the access point 110 illustrated in FIG. 2 or the processor 304 and/or the DSP 320 portrayed in FIG. 3. The means for outputting (e.g., transmitting) may comprise a transmitter (e.g., the transmitter unit 222) and/or an antenna(s) 224 of the access point 110 illustrated in FIG. 2 or the transmitter 310 and/or antenna(s) 316 depicted in FIG. 3.

Means for obtaining (e.g., receiving) may comprise a receiver (e.g., the receiver unit 254) and/or an antenna(s) 252 of the UT 120 illustrated in FIG. 2 or the receiver 312 and/or antenna(s) 316 depicted in FIG. 3. Means for determining may include a processing system, which may include one or more processors such as processors 260, 270, 288, and 290 and/or the controller 280 of the UT 120 or the processor 304 and/or the DSP 320 portrayed in FIG. 3.

Means for radiating and receiving electromagnetic signals may comprise any antennas for apparatus for wireless communications 400, such as the antennas 404 or 406 shown in FIGS. 4A and 4B or any of the antennas described with respect to FIGS. 1-3. In particular, such antennas may be patch antennas (full or half), dipole antennas, folded monopole antennas, slot antennas, horn antennas, or inverted-F antennas, to name a few. Amplifying means may comprise any gain amplifier circuits or devices, such as LNAs or power amplifiers, associated with an antenna. For example, LNAs 920 or PAs 940, as described with respect to FIG. 9. Any means for determining, means for reducing, or means for restoring power may comprise a processing system, which may include one or more processors, such as the processors 210, 242, and/or the controller 230 of the access point 110 illustrated in FIG. 2 or the processor 304 and/or the DSP 320 portrayed in FIG. 3.

According to certain aspects, such means may be implemented by processing systems configured to perform the corresponding functions by implementing various algorithms (e.g., in hardware or by executing software instructions) described above.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Furthermore, "determining" may include resolving, selecting, choosing, establishing and the like.

As used herein, the term "outputting" may involve actual transmission or output of a structure from one entity (e.g., a processing system) to another entity (e.g., an RF front end or modem) for transmission. As used herein, the term "obtaining" may involve actual receiving of a structure transmitted over the air or obtaining the structure by one entity (e.g., a processing system) from another entity (e.g., an RF front end or modem).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the Physical (PHY) layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may comprise a computer-readable medium having instructions stored (and/or encoded) thereon, the instructions being executable by one or more processors to perform the operations described herein and be embodied in a computer-program product. The computer-program product may comprise packaging materials to advertise the computer-readable medium therein for purchase by consumers.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
a substrate;
a plurality of first antennas disposed in the substrate, wherein the plurality of first antennas are arranged in a two-dimensional array; and
a plurality of second antennas disposed in the substrate, wherein each of the plurality of first antennas is configured to have a peak gain in one or more first directions substantially perpendicular to the substrate, and wherein each of the plurality of second antennas is configured to have a peak gain in one or more second directions substantially diverging from the first directions;
wherein the plurality of second antennas comprises a first group of antennas and a second group of antennas arranged in first and second one-dimensional arrays adjacent to first and second sides of the two-dimensional array, respectively, the first group of antennas of the plurality of second antennas comprising shorted half wavelength patch antennas, and the second group of antennas of the plurality of second antennas comprising dipole antennas.

2. The apparatus of claim 1, wherein an angle between one of the second directions and a lateral plane of the substrate is between 0 degree and 45 degrees.

3. The apparatus of claim 1, wherein the plurality of second antennas surrounds the plurality of first antennas.

4. The apparatus of claim 1, wherein at least one of the plurality of first antennas comprises a patch antenna.

5. The apparatus of claim 1, further comprising:
a plurality of gain amplifiers associated with the plurality of first antennas and the plurality of second antennas; and
a processing system configured to determine a subset of the plurality of first antennas and the plurality of second antennas contributing to a communications session and to reduce power of those gain amplifiers not associated with the subset.

6. The apparatus of claim 5, wherein the processing system is further configured to periodically restore full power to those gain amplifiers not associated with the subset and repeat the determination and the reduction.

7. The apparatus of claim 5, wherein the processing system is further configured to determine the subset by selecting the subset based on comparing received signals for the communications session to at least one threshold value.

8. The apparatus of claim 5, wherein the processing system is further configured to determine the subset by selecting the subset based on a statistical analysis of received signals for the communications session.

9. The apparatus of claim 1, wherein the first and second sides of the two-dimensional array are adjacent sides.

10. The apparatus of claim 1, wherein the first group of antennas include a third one-dimensional array adjacent to a third side of the two-dimensional array.

11. The apparatus of claim 10, wherein the second group of antennas include a fourth one-dimensional array adjacent to a fourth side of the two-dimensional array.

12. The apparatus of claim 11, wherein the first and third sides of the two-dimensional array are opposite sides, and wherein the second and fourth sides of the two-dimensional array are opposite sides.

13. The apparatus of claim 1, wherein the two-dimensional array of the plurality of first antennas is configured into a cross pattern.

14. A method for wireless communication, comprising:
providing a substrate;
disposing a plurality of first antennas in the substrate, wherein the plurality of first antennas are arranged in a two-dimensional array;
disposing a plurality of second antennas in the substrate;
configuring each of the plurality of first antennas to have a peak gain in one or more first directions substantially perpendicular to the substrate;
configuring each of the plurality of second antennas to have a peak gain in one or more second directions substantially diverging from the first directions, wherein the plurality of second antennas comprises a first group of antennas and a second group of antennas arranged in first and second one-dimensional arrays adjacent to first and second sides of the two-dimensional array, respectively; and
selecting shorted half wavelength patch antennas as the first group of antennas of the second plurality of antennas and dipole antennas as the second group of antennas of the second plurality of antennas.

15. The method of claim 14, further comprising:
providing a plurality of gain amplifiers associated with the plurality of first antennas and the plurality of second antennas;
determining a subset of the plurality of first antennas and the plurality of second antennas contributing to the communications session; and
reducing power for those gain amplifiers not associated with the subset.

16. The method of claim 15, further comprising periodically restoring full power to those gain amplifiers not associated with the subset and repeating the determining and the reducing.

17. The method of claim 15, wherein the determining of the subset comprises selecting the subset based on comparing received signals for the communications session to at least one threshold value.

18. The method of claim 15, wherein the determining of the subset comprises selecting the subset based on a statistical analysis of received signals for the communications session.

19. The method of claim 14, further comprising selecting an angle between the second directions and a lateral plane of the substrate to be between 0 degrees and 45 degrees.

20. The method of claim 14, further comprising selecting the second antennas to be arranged in the substrate to surround the first antennas.

21. The method of claim 14, further comprising selecting at least one of the first plurality of antennas as a patch antenna.

22. A wireless node, comprising:
a substrate;
a plurality of first antennas disposed in the substrate, wherein the plurality of first antennas are arranged in a two-dimensional array;
a plurality of second antennas disposed in the substrate;
a processing system configured to generate data; and
a transmitter configured to transmit, via at least one of the first antennas and the second antennas, the data,
wherein each of the first antennas are configured to have a peak gain in one or more first directions substantially perpendicular to the substrate, and wherein each of the second antennas are configured to have a peak gain in one or more second directions substantially diverging from the first directions;
wherein the plurality of second antennas comprises a first group of antennas and a second group of antennas arranged in first and second one-dimensional arrays adjacent to first and second sides of the two-dimensional array, respectively, the first group of antennas of the plurality of second antennas comprising shorted half wavelength patch antennas and the second group of antennas of the plurality of second antennas comprising dipole antennas.

* * * * *